United States Patent
Lee

(10) Patent No.: US 11,281,225 B2
(45) Date of Patent: Mar. 22, 2022

(54) DRIVING METHOD OF ROBOT

(71) Applicant: LG ELECTRONICS INC., Seoul (KR)

(72) Inventor: Don Geun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 253 days.

(21) Appl. No.: 16/590,196

(22) Filed: Oct. 1, 2019

(65) Prior Publication Data
US 2020/0047342 A1 Feb. 13, 2020

(30) Foreign Application Priority Data
Aug. 8, 2019 (KR) .................. 10-2019-0096738

(51) Int. Cl.
*G05D 1/02* (2020.01)

(52) U.S. Cl.
CPC ......... *G05D 1/0214* (2013.01); *G05D 1/0234* (2013.01); *G05D 1/0274* (2013.01)

(58) Field of Classification Search
CPC ... G05D 2201/0203; G05D 2201/0206; G05D 2201/0211; G05D 2201/0212; G05D 2201/0213; G05D 2201/0216; G05D 2201/02; G05D 1/02; G05D 1/021; G05D 1/0212; G05D 1/0214; G05D 1/0227; G05D 1/0229; G05D 1/0231; G05D 1/0234; G05D 1/0236; G05D 1/0242–0257; A61H 3/04–066; B25J 9/1666; B25J 9/1676; B25J 9/162
See application file for complete search history.

(56) References Cited

FOREIGN PATENT DOCUMENTS

| JP | 2019046464 A | * 3/2019 |
|---|---|---|
| KR | 1020170061355 | 6/2017 |
| KR | 1020170138977 | 12/2017 |

OTHER PUBLICATIONS

Yoshida et al., "Autonomous Mobile Robot Navigation Using Braille Blocks in Outdoor Environment," 2004, Journal of the Robotics Society of Japan, vol. 22, No. 4, pp. 469-477 (Year: 2004).*

* cited by examiner

*Primary Examiner* — Spencer D Patton
(74) *Attorney, Agent, or Firm* — Lee Hong Degerman Kang & Waimey

(57) ABSTRACT

Provided is a driving method of a robot including setting a driving route based on a map held by the robot, driving the robot along a set driving path, checking, by the robot, whether braille blocks for a visually impaired person are around the driving route using the detection sensor while the robot is driving, and driving, by the robot, along the braille blocks when the braille blocks are around the driving route. The robot may transmit and receive radio signals on a mobile communication network established according to 5G communication.

19 Claims, 11 Drawing Sheets

DRIVING METHOD OF ROBOT

CROSS-REFERENCE TO RELATED APPLICATION

Pursuant to 35 U.S.C. § 119(a), this application claims the benefit of earlier filing date and right of priority to Korean Application No. 10-2019-0096738, filed on Aug. 8, 2019, the contents of which are all hereby incorporated by reference herein in its entirety.

BACKGROUND

1. Technical Field

The present disclosure relates to a driving method of a robot, and more particularly, to a driving method of a robot capable of autonomous driving using braille blocks for a visually impaired person.

2. Description of Related Art

Contents described in the background merely provide background information on the present embodiment and do not constitute the related art.

The provision of services using a robot is spreading. For example, researches are being actively conducted on robots that guide customers or carry goods of customers in airport station, train station, and the like.

In order for the robot to perform these functions, the robot should be able to autonomously drive from a starting point to a target point.

On the other hand, in order for the robot to autonomously drive, the robot needs to determine its current position while driving and recognize the surrounding geographic features on its own driving path.

To this end, the robot needs to perform simultaneous localization and mapping (SLAM).

In Korean Patent Publication No. 10-2017-0061355, disclosed is a configuration for tracking the position of a mobile robot by analyzing an image acquired from a camera and increasing the accuracy of SLAM.

In Korean Patent Publication No. 10-2017-0138977, disclosed is a configuration in which odometry information obtained in a moving process of a walking robot is applied to an image-based SLAM technology.

In general, in order for an autonomously driving robot to perform the SLAM, a visual sensing means provided in the robot determines the surrounding geographic features and generates a map and estimates a location the map based on the determined result.

In order for the robot to perform the SLAM, it is necessary to clearly recognize the surrounding geographic features while driving. A visual sensing means generally used in the autonomous driving field acquires information about geographic features around the robot by photographing in front, rear, left, and right directions, or a head upward direction of the robot.

However, if there is no geographic feature required to create a map in the front, rear, left, or right directions of the robot, or if there is no geographic feature required to create a map in the upper head of the robot due to outdoors, the robot does not accurately determine the surrounding situation.

As a result, a SLAM error may occur such as generating an error map or not determining its current location by the robot, and thus, autonomous driving may be impossible or the robot may approach a dangerous area. This problem needs to be solved.

SUMMARY OF THE INVENTION

In an exemplary embodiment, in order to suppress the occurrence of a SLAM error during autonomous driving of a robot, there is provided a method of performing autonomous driving by the robot by using braille blocks for visually impaired people, which are geographic features that are easily recognized by a detection sensor and enables stable SLAM without changing the arrangement for a long time.

The objectives to implement in the embodiments are not limited to the technical objectives described above, and other objectives that are not stated herein will be clearly understood by those skilled in the art from the following specifications.

In order to achieve the above object, a robot may include a detection sensor for recognizing a surrounding situation.

The driving method of a robot may include setting a driving route based on a map held by the robot, driving the robot along a set driving path, checking, by the robot, whether braille blocks for a visually impaired person are around the driving route using the detection sensor while the robot is driving, and driving, by the robot, along the braille blocks when the braille blocks are around the driving route.

The robot may drive drives at a position spaced apart from the braille blocks.

The detection sensor may be provided as a light detection and ranging (LiDAR) sensor.

When the robot cannot bypass the braille blocks to reach the target point, the robot may step over the braille blocks based on the surrounding situation and the position of the target point detected by the detection sensor.

When the robot steps over the braille blocks, the robot may drive on a path that minimizes the length of a section stepping on the braille blocks.

The braille blocks may include a first block for guiding a visually impaired person to a walking direction and a second block for guiding the visually impaired person to stopping or changing the walking direction.

When the robot recognizes the first block, the robot may drive along a direction in which the plurality of first blocks are arranged, and when the robot recognizes the second block, the robot may pause.

When the robot recognizes the second block, the robot may determine whether to derive or a driving direction based on a surrounding situation recognized by the detection sensor.

The robot may drive at a predetermined separation distance from the first block or the second block, and the separation distance may be set in consideration of the size of the robot and the size of a space in which the robot is drivable.

The map held by the robot may include data about the braille blocks.

When the map includes data about the braille blocks, the robot may recognize a position of the braille blocks based on the map to approach the braille blocks.

The map held by the robot may not include data about the braille blocks.

When the map does not include the data about the braille blocks, the robot may approach the recognized braille blocks when the detection sensor recognizes the braille blocks.

When the map does not have the data about the braille blocks, the robot may recognize the existence of the first block or the second block and a pattern disposed with the first block or the second block through the detection sensor to determine a driving direction and a driving path.

The robot may store information about the arrangement of the first block or the second block obtained through the detection sensor.

The robot may recognize the disposed pattern of the braille blocks through the detection sensor and correct the held map.

The robot may detect a boundary between the plurality of braille blocks adjacent to each other through the detection sensor, determine the number of braille blocks by using the detected boundary, determine a driving distance of the robot by using the number of braille blocks, and correct data about the map using the driving distance of the robot.

The robot may recognize the disposed pattern of the braille blocks through the detection sensor and determines a current position of the robot.

An exemplary embodiment provides a driving method of a robot including a detection sensor recognizing a surrounding situation, the driving method including setting a driving route based on a map held by the robot, driving the robot along a set driving path, checking, by the robot, whether braille blocks for a visually impaired person are around the driving route using the detection sensor while the robot is driving, and driving, by the robot, along the braille blocks when the braille blocks are around the driving route, in which the braille blocks include a first block for guiding a visually impaired person to a walking direction and a second block for guiding the visually impaired person to stopping or changing the walking direction, and when the robot recognizes the first block, the robot drives along a direction in which the plurality of first blocks are arranged, and when the robot recognizes the second block, the robot pauses.

The robot may drive at a predetermined separation distance from the first block or the second block, and the separation distance may be set in consideration of the size of the robot and the size of a space in which the robot is drivable.

When the map does not have the data about the braille blocks, the robot may recognize the existence of the first blocks or the second blocks and a pattern disposed with the first blocks or the second blocks through the detection sensor to determine a driving direction and a driving path and stores information about an arrangement of the first blocks or the second blocks obtained through the detection sensor.

In an exemplary embodiment, the braille blocks whose arrangement state is not changed for a long time are recognized, the current position of the robot is determined, a map for autonomous driving is obtained, thereby simply and accurately performing the SLAM.

In an exemplary embodiment, the SLAM is performed by recognizing the braille block, so that separate expensive equipment for performing the accurate SLAM may not be required or may be reduced, and it may be advantageous in terms of cost.

In an exemplary embodiment, the robot recognizes the second block representing the danger zone among the braille blocks to avoid entry of the danger zone, thereby suppressing the damage to the robot and promoting the safety of people therearound.

In an exemplary embodiment, when the robot moves along the direction in which the braille blocks are arranged at a position spaced apart from the braille blocks, and the robot steps over the braille blocks, the robot drives on a path that minimizes the length of the section stepping on the braille blocks, thereby significantly reducing the impact applied when the robot steps over the braille blocks.

BRIEF DESCRIPTION OF THE DRAWINGS

The above and other aspects, features, and advantages of the present disclosure will become apparent from the detailed description of the following aspects in conjunction with the accompanying drawings, in which:

FIGS. 5 and 6 illustrate a target point of the robot as X;

DETAILED DESCRIPTION

Hereinafter, the present invention will be described in detail with reference to the accompanying drawings. Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by claims. Although the terms first, second, third, etc. may be used herein to describe various elements, components, regions, layers and/or sections, these elements, components, regions, layers and/or sections should not be limited by these terms.

Terms such as "first," "second," and other numerical terms when used herein do not imply a sequence or order unless clearly indicated by the context. These terms are generally only used to distinguish one element from another. Thus, a first element, component, region, layer or section discussed below could be termed a second element, component, region, layer or section without departing from the teachings of the example embodiments.

In the following description, when an element is described as being formed "on (over)" or "beneath (under)" another element, the element includes two elements that are in direct contact with each other, or one or more other elements disposed indirectly between the two elements. Terms formed "on (over)" or "beneath (under)" may denote not only the upward direction from one element but the downward direction.

The relational terms used in the following description such as "on/upper/over" and "beneath/lower/under" may be used to discriminate any one subject or component from another subject or component without necessarily requiring or including any physical or logical relationship of corresponding subjects or components.

Figure 1:
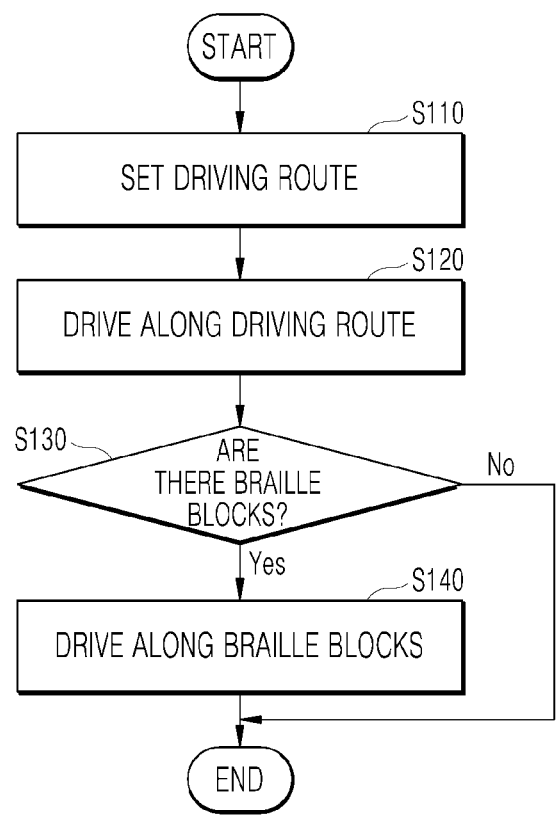
FIG. 1 is a diagram for describing a driving method of a robot according to an exemplary embodiment.

FIG. 1 is a diagram for describing a driving method of a robot 100 according to an exemplary embodiment.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driving unit including a motor in order to perform various physical operations, such as moving joints of the robot. Moreover, a movable robot may include, for example, a wheel, a brake, and a propeller in the driving unit thereof, and through the driving unit may thus be capable of driving on the ground or flying in the air.

The embodiment relates to a driving method of a robot 100 having a detection sensor for recognizing a situation of the surroundings.

The robot 100 is capable of autonomous driving and, for example, may carry a customer's goods or serve to guide the customer at an airport, a large shopping mall, or the like.

Autonomous driving refers to a technology in which driving is performed autonomously, and an autonomous vehicle refers to a vehicle capable of driving without manipulation of a user or with minimal manipulation of a user.

For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, the autonomous driving vehicle may be a robot 100 having an autonomous driving function.

The embodiment may relate to extended reality. The extended reality collectively refers to virtual reality (VR), augmented reality (AR), and mixed reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, there is a difference in that in AR technology, the virtual object is used as a complementary form to the real object, whereas in the MR technology, the virtual object and the real object are used in the same nature.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

The robot 100 includes a communication device, is connected to a server through the communication device, and obtains necessary information or receives an update from the server.

The communication device provided in the robot 100 may be configured to include at least one of a mobile communication module and a wireless internet module for communication with the server. In addition, the robot 100 may further include a near field communication (NFC) module.

The mobile communication module can transmit and receive a wireless signal with at least one of a base station, an external terminal, and a server on a mobile communication network according to the technology standards or the communication method for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G mobile communication, etc.).

The wireless internet module refers to a module for wireless internet access and may be provided in the robot 100. The wireless Internet module may transmit and receive the wireless signal in a communication network in accordance with wireless Internet technologies.

The robot 100 may transmit and receive data to and from the server and the terminal capable of performing various communications through a 5G network. In particular, the robot 100 may perform data communications with the server and the terminal by using at least one network service among enhanced mobile broadband (eMBB), ultra-reliable and low latency communications (URLLC), and massive machine-type communications (mMTC) through the 5G network.

The eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the large-volume traffic may be accommodated in an area where user mobility is low and user density is high. Through broadband coverage, a wide-range and stable wireless environment and user mobility may be guaranteed.

The URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

The mMTC is a transmission delay-insensitive service that requires a relatively small amount of data transmission. A much larger number of terminals, such as sensors, than a general portable phone may be connected to a wireless access network by mMTC at the same time. The communication module of the terminal 300 should be inexpensive, and there is a need for improved power efficiency and power saving technology capable of operating for years without battery replacement or recharging.

Artificial intelligence may be applied to the robot 100. Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value. The ANN may include an input layer, an output layer, and may selectively include one or more hidden layers. Each layer includes one or more neurons, and the artificial neural network may include synapses that connect the neurons to one another. In the ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training the ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

The supervised learning may refer to a method for training an artificial neural network with training data that has been given a label. In addition, the label may refer to a target answer (or a result value) to be guessed by the artificial neural network when the training data is inputted to the artificial neural network. The unsupervised learning may refer to a method for training an artificial neural network using training data that has not been given a label. The reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

For autonomous driving, the robot 100 may include a map for autonomous driving, and may drive by setting a driving route on the included map.

The robot 100 may determine surrounding geographic features and situations through a detection sensor while driving, generate a map including the detected geographic features, and determine its current location using the generated map. That is, the robot 100 may perform simultaneous localization and mapping (SLAM) for autonomous driving. The SLAM itself is well known in the art, and the description of the specific technical contents is omitted.

In order to perform the SLAM, the robot 100 is provided with a detection sensor, the detection sensor may determine information about the surrounding geographic features. The detection sensor is used as a sensing means for a laser, an IR, an RGB camera, and other various things.

The detection sensor may be provided as, for example, a light detection and ranging (LiDAR) sensor. The LiDAR sensor may emit light having a specific pattern, receive reflected light, and acquire information about surrounding geographic features based on the reflected light. That is, the information about the surrounding geographic features may be acquired by a round trip time until the emitted light is reflected and returned, a change in pulse power of the light, a phase change, a change in pulse width, and the like.

In order for the robot 100 to perform the SLAM, it is necessary to clearly recognize the surrounding geographic features while driving. A LiDAR sensor generally used in the autonomous driving field acquires information about geographic features around the robot 100 by photographing in front, rear, left, and right directions, or a head upward direction of the robot 100.

However, when the SLAM is performed using the LiDAR sensor, if there is no geographic feature required to create a map in the front, rear, left, and right directions of the robot 100, or there is no geographic feature required to create a map in the head upward direction of the robot 100 due to outdoors, the robot 100 may not accurately determine the surrounding situation.

As a result, a SLAM error may occur such as generating an error map or not determining its current location by the robot 100, and thus, autonomous driving may be impossible or the robot 100 may approach a dangerous area.

In an exemplary embodiment, in order to suppress the occurrence of a SLAM error, there is provided a method of performing autonomous driving by the robot 100 by using the braille blocks 10 for the visually impaired person, which is a geographic feature that is easily recognized by the detection sensor and enables stable SLAM without changing the arrangement for a long time.

The robot 100 may set a driving route based on a map held by the robot 100 (S110). The map may be a precise map for autonomous driving, and may be held by the robot 100 by receiving the map from a server, or by obtaining the map by itself by performing the SLAM by the robot 100. The map may be transmitted from the server or periodically updated through the SLAM of the robot 100.

When a target point is set, the robot 100 may set a driving route from a current position to the target point on the map. The driving route bypasses, for example, a danger zone, and may be determined in consideration of the avoidance of a moving means capable of damaging people such as an elevator, the avoidance of places where the driving is difficult due to the structure of the robot 100, and a shortest distance to the target point, and the like. A criterion for setting the driving route may be preset in an autonomous driving program of the robot 100.

The robot 100 may drive along a predetermined driving path (S120). The robot 100 may perform SLAM while driving. For the SLAM, the robot 100 needs to detect and recognize a geographic feature around a driving route. In order to suppress an SLAM error, it is possible to use the braille blocks 10, which is a geographic feature disposed at a predetermined position without changing for a long time.

While the robot 100 is driving, the robot 100 may check whether the braille blocks 10 for the visually impaired person is around the driving path using the detection sensor (S130). If the braille blocks 10 are not found around the driving route, the robot 100 may autonomously drive while performing the SLAM by detecting a surrounding geographic feature using the detection sensor.

When the braille blocks 10 are around the driving route, the robot 100 may drive along the braille blocks 10 (S140).

Figure 2:
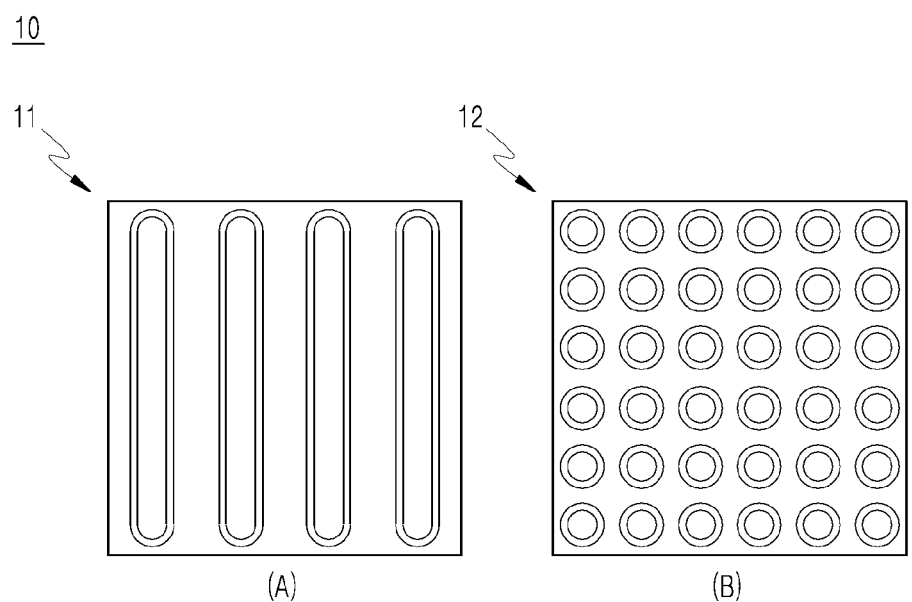
FIG. 2 is a plan view of the braille blocks according to an exemplary embodiment.

FIG. 2 is a plan view of braille blocks 10 according to an exemplary embodiment. The braille blocks 10 are installed in the subway, street sidewalks, indoors or outdoors of buildings, and various other places to assist walking of the visually impaired person.

The standard of the braille blocks 10 are the same in one country. Hereinafter, an exemplary embodiment will be described based on a standardized braille blocks 10 used in Korea.

The braille blocks 10 have a square shape, horizontal and vertical lengths are standardized, and the area thereof is the same. The braille blocks 10 have a protruding pattern, and the pattern may vary depending on a role of the braille blocks 10.

Referring to FIG. 2, the braille blocks 10 may include a first block 11 for guiding a visually impaired person to a walking direction to and a second block 12 for guiding the visually impaired person to stopping or changing the walking direction.

In general, when the visually impaired person detects the first block 11, the visually impaired person moves along the first block 11 in the direction in which the first block 11 is arranged. The second block 12 reminds the visually impaired person that it is dangerous if the visually impaired person proceeds further.

For example, the second block 12 is installed in front of a stand position of a passenger car, an elevator or an escalator, and a door in a subway platform. The second block 12 is also used to indicate a change in driving direction, which will be described below.

Therefore, when the visually impaired person detects the second block 12, the visually impaired person first stops and then determines the next action. For example, if the second block 12 is installed in front of the stand position of the passenger car, the visually impaired person waits for arriving of the passenger car, and if the second block 12 is installed in front of the elevator, the visually impaired person may ride the elevator.

The first block 11 and the second block 12 may be distinguished from each other in the shape of the protruding pattern. In Korea, as illustrated in FIG. 2, the first block 11 may have a linear pattern, and the second block 12 may have a dotted pattern. In FIG. 2 below, the first block 11 is represented by a linear pattern, and the second block 12 is represented by a dotted pattern.

Figure 3A:
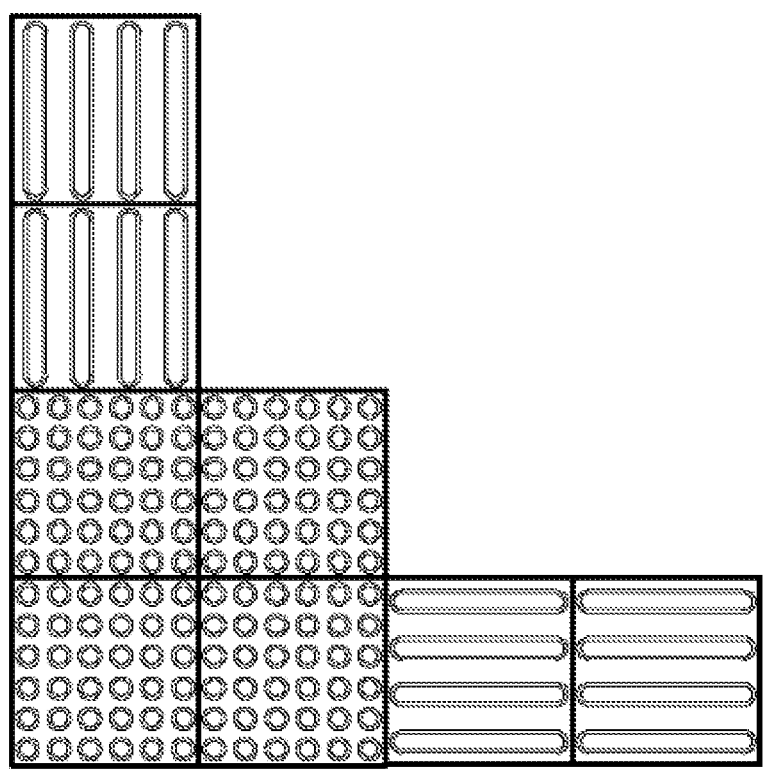
FIG. 3A is a plan view of a disposed structure of the braille blocks according to an exemplary embodiment.
Figure 3B:
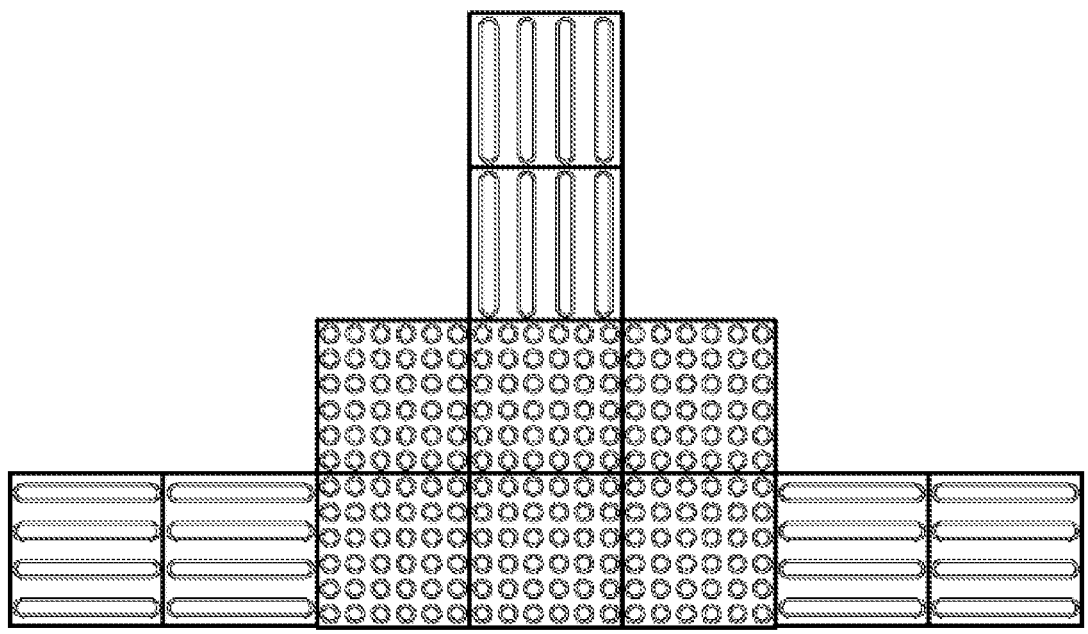
FIG. 3B is a plan view of a disposed structure of the braille blocks according to another exemplary embodiment.
Figure 3C:
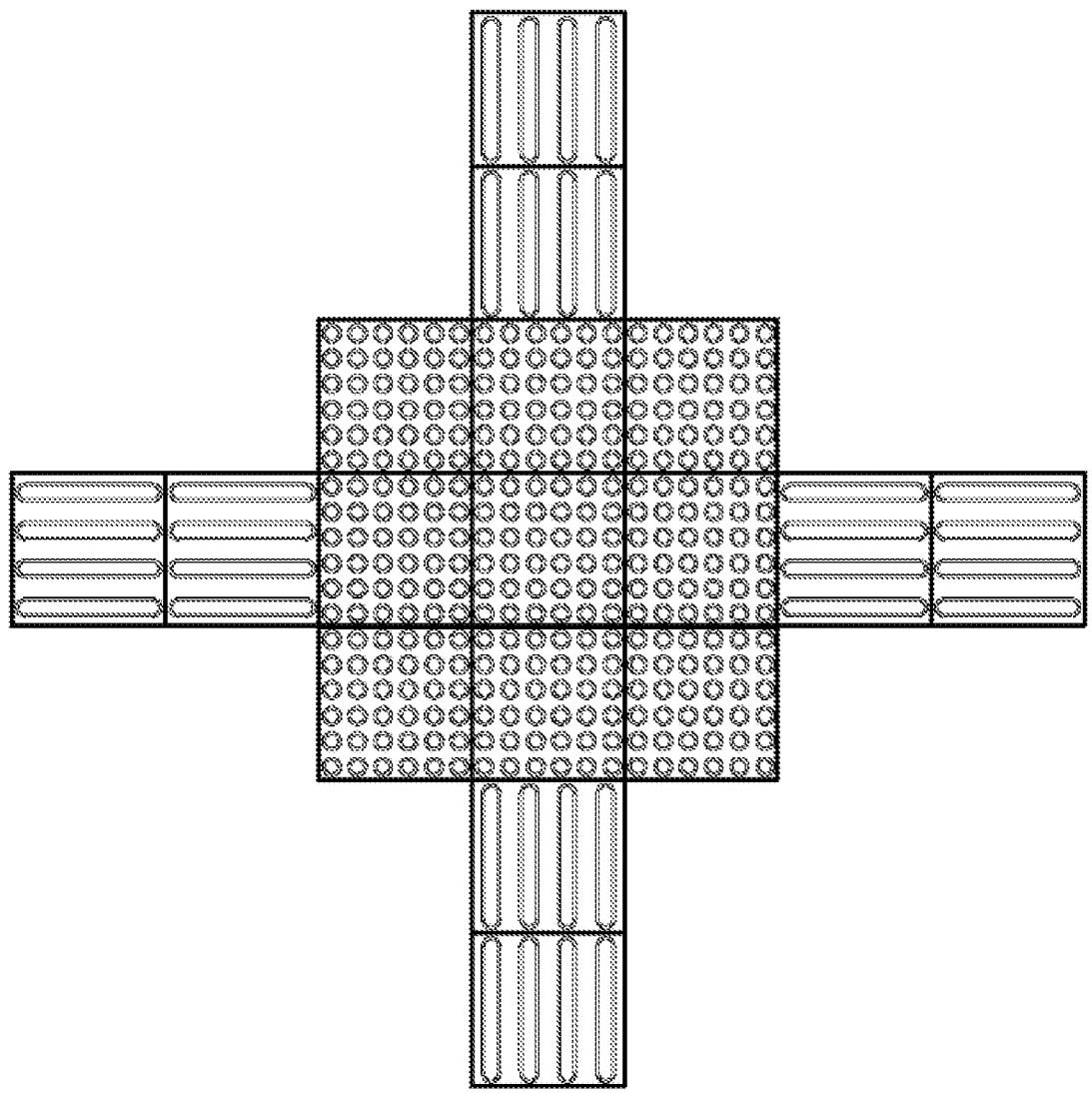
FIG. 3C is a plan view of a disposed structure of the braille blocks according to the other exemplary embodiment.

FIG. 3A is a plan view of arrangement structure of braille blocks 10 according to an exemplary embodiment. FIG. 3B is a plan view of arrangement structure of braille blocks 10 according to another exemplary embodiment. FIG. 3C is a plan view of arrangement structure of braille blocks 10 according to the other exemplary embodiment. The braille blocks 10 may be arranged by combining the first blocks 11 and the second blocks 12 to display a direction and a terrain to the visually impaired person.

When an advancing direction is changed to a "L"-lettered shape, the braille blocks 10 may be arranged by combining the first blocks 11 and the second blocks 12 as illustrated in FIG. 3A.

When the first blocks 11 arranged in three directions meet each other, the braille blocks 10 may be arranged by combining the first blocks 11 and the second blocks 12 as shown in FIG. 3B.

When the first blocks 11 arranged in four directions meet each other, the braille blocks 10 may be arranged by combining the first blocks 11 and the second blocks 12 as shown in FIG. 3C.

The visually impaired person may detect the arrangement structure of the braille blocks 10 in which the first blocks 11 and the second blocks 12 are combined as described above with a tactile sense and may walk on the basis of the detected sense.

Similarly, the robot 100 may detect the arrangement structure of the braille blocks 10 in which the first blocks 11 and the second blocks 12 are combined as described above with a detection sensor and may drive on the basis of the detected information.

The robot 100 may recognize the disposed pattern of the braille blocks 10 through the detection sensor and determine its current position. For example, the arranged patterns of the braille blocks 10 illustrated in FIGS. 3A to 3C may be visually distinguished from the surrounding geographic features.

Therefore, these patterns may be a land mark that may specify the current position of the robot 100 during driving required for performing the SLAM. Therefore, the robot 100 recognizes the arranged pattern of the braille blocks 10 and determines the current position of the robot, thereby effectively performing the SLAM.

Figure 4A:
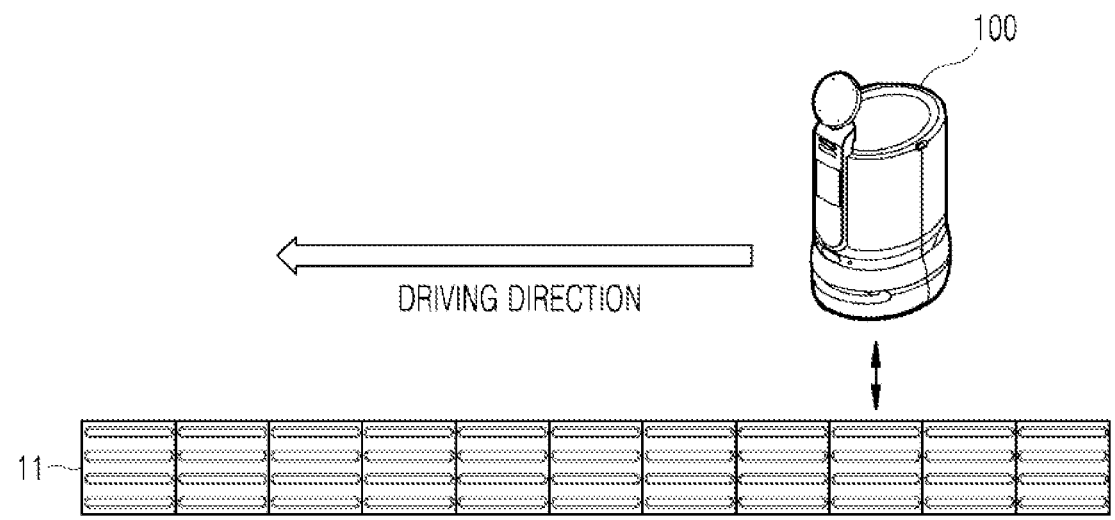
FIG. 4A is a diagram for describing a method of driving a robot along the braille blocks according to an exemplary embodiment.
Figure 4B:
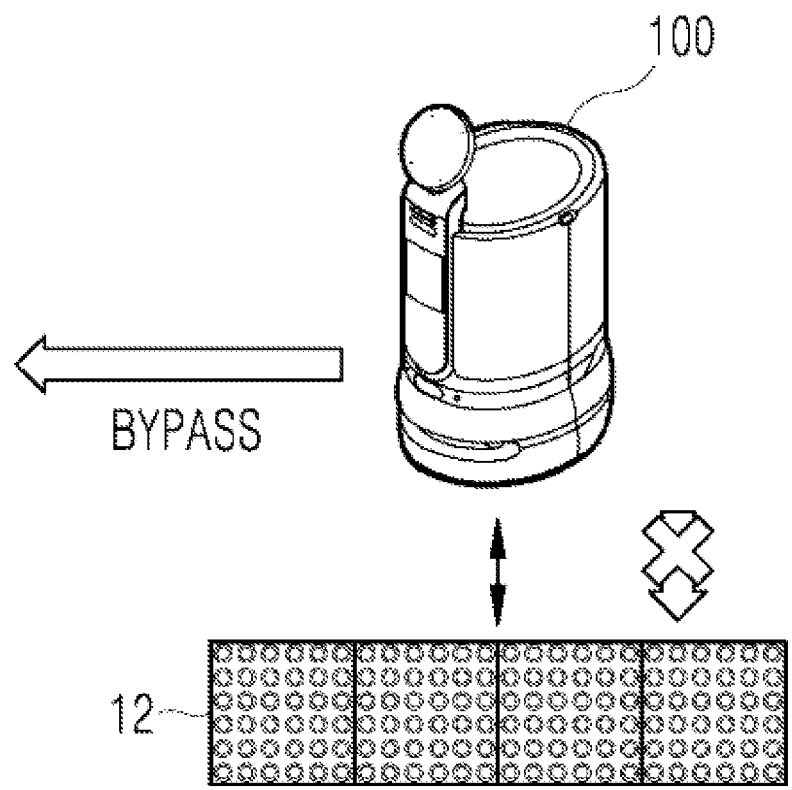
FIG. 4B is a diagram for describing a method of driving a robot along the braille blocks according to another exemplary embodiment.

FIG. 4A is a diagram for describing a method of driving a robot 100 along braille blocks 10 according to an exemplary embodiment. FIG. 4B is a diagram for describing a method of driving a robot 100 along braille blocks 10 according to an exemplary embodiment. When the robot 100 detects the braille blocks 10 with a detection sensor, the robot 100 may approach the braille blocks 10.

The robot 100 may drive along the braille blocks 10 in a direction in which the braille blocks 10 are arranged. If necessary, the robot 100 may step over the braille blocks 10. The robot 100 may drive in a position spaced apart from the braille blocks 10 by a predetermined distance except for stepping over the braille blocks 10.

When the robot 100 drives on the braille blocks 10, the robot 100 may be impacted due to the protruding pattern of the braille blocks 10. Due to such an impact, the device provided in the robot 100 may be damaged, and the robot 100 may be shaken and the detection sensor may recognize unclearly the surrounding geographic features.

Due to such breakage and unclear recognition of the geographic feature, an error may occur in the SLAM of the robot 100.

In order to suppress the SLAM error, the robot 100 drives at a position spaced apart from the braille blocks 10 by a predetermined distance except when stepping over the braille blocks 10 to minimize the impact received from the braille blocks 10.

Referring to FIGS. 4A and 4B, the robot 100 may drive at a predetermined separation distance from the first block 11 or the second block 12. In FIGS. 4A and 4B, two way arrow indicates that the robot 100 has a predetermined separation distance from the first block 11 or the second block 12.

In this case, the separation distance may be appropriately set in consideration of the size of the robot 100 and the size of a space in which the robot 100 can drive.

Referring to FIGS. 4A and 4B, when the robot 100 detects the braille blocks 10, the robot 100 may approach the braille blocks 10. The robot 100 may recognize the protruding pattern of the braille blocks 10 to determine whether the braille blocks 10 are the first block 11 or the second block 12.

Referring to FIG. 4A, when the robot 100 recognizes the first block 11, the robot 100 may drive along a direction in which a plurality of first blocks 11 are arranged. The robot 100 may drive at a predetermined separation distance from the first block 11.

Referring to FIG. 4B, when the robot 100 recognizes the second block 12, the robot 100 may pause. Since the second block 12 indicates an area where the robot 100 must not pass or an area dangerous to drive, the robot 100 may pause to determine a later action.

When the robot 100 recognizes the second block 12, the robot 100 may determine whether to drive or a driving direction based on a surrounding situation recognized by the detection sensor.

For example, if there is an escalator or an elevator that prohibits the robot 100 from driving beyond the second block 12, the robot 100 does not cross the second block 12 and may find another driving path which returns to a previous position and drives to a target point by the detection sensor.

For example, if there is not enough space for the robot 100 to bypass the second block 12 and the target point is in a place where the second block 12 needs to pass, the robot 100 may step over the second block 12 through the detection sensor.

For example, through the detection sensor, if there is enough space for the robot 100 to bypass the second block 12 and the target point is in a place where the second block 12 needs to pass, as illustrated in FIG. 4B, the robot 100 may drive by bypassing the second block 12 in a direction illustrated by an arrow without stepping over the second block 12 through the detection sensor.

When the robot 100 steps over the braille blocks 10, the robot 100 may drive on a path that minimizes the length of a section stepping on the braille blocks 10. This is to minimize the impact applied to the robot 100 due to the protruding pattern of the braille blocks 10 when the robot 100 cannot bypass and steps over the braille blocks 10.

In an exemplary embodiment, the map held by the robot 100 may include data regarding the braille blocks 10. The data relating to the braille blocks 10 is, for example, about a position on the map where the braille blocks 10 are disposed, and whether the disposed braille blocks 10 are the first block 11 or the second block 12, and a structure in which the first block 11 and the second block 12 are combined and arranged.

When the robot 100 receives the data about the braille blocks 10 through the server, or holds the data about the braille blocks 10 obtained by performing the SLAM on a driving path where the robot 100 has already driven, the robot 100 may hold a map including the data relating to the braille blocks 10.

When the map provided in the robot 100 includes data about the braille blocks 10, the robot 100 recognizes a position of the braille blocks 10 based on the map to approach the braille blocks 10.

That is, the robot 100 already knows the position of the braille blocks 10 around the driving path based on the held data about the braille blocks 10 and approaches the braille blocks 10 to drive along the braille blocks 10.

In another embodiment, the map held by the robot 100 may not include the data about the braille blocks 10. When the robot 100 cannot receive the data about the braille blocks 10 through the server or when the robot 100 drives in a first route, the robot 100 may hold a map without providing the data about the braille blocks 10.

When the map held in the robot 100 does not include the data about the braille blocks 10, the robot 100 recognizes the braille blocks 10 by the detection sensor to approach the recognized braille blocks 10.

That is, if the map does not have the data about the braille blocks 10, when the robot 100 drives on a predetermined driving path and the detection sensor finds the braille blocks 10 around the robot, the robot 100 may drive along the braille blocks 10 by approaching the braille blocks 10.

When the map held by the robot 100 does not have the data about the braille blocks 10, the robot 100 may recognize the existence of the first block 11 or the second block 12 and a pattern disposed with the first blocks 11 or the second blocks 12 through the detection sensor to determine the driving direction and the driving path.

For example, when the braille blocks 10 found by the robot 100 is the first block 11, the robot 100 approaches the first block 11 and then drive in a direction in which the first blocks 11 are arranged at a predetermined distance.

For example, when the braille blocks 10 found by the robot 100 is the second block 12, the robot 100 approaches the second block 12 and then pauses and determines a surrounding situation to determine the driving and the driving direction.

For example, if the combined patterns of the first blocks 11 and the second blocks 12 found by the robot 100 are as shown in FIGS. 3A to 3C, the robot 100 may determine the driving direction and the driving route in consideration of the geographical relationship between the current location of the robot and the target point.

When the map held by the robot 100 does not have the data about the braille blocks 10, the robot 100 may store information on the arrangement of the first blocks 11 or the second blocks obtained through the detection sensor while driving.

The information about the arrangement of the first blocks 11 or the second blocks 12 stored in the robot 100 may be added to the map. Therefore, even if the robot 100 performs autonomous driving using a map without the data about the braille blocks 10, the robot 100 obtains data on the braille blocks 10 by performing the SLAM while driving, and when driving the same driving path later, the robot 100 may generate and drive the driving path using the map including the data about the braille blocks 10.

Figure 5:
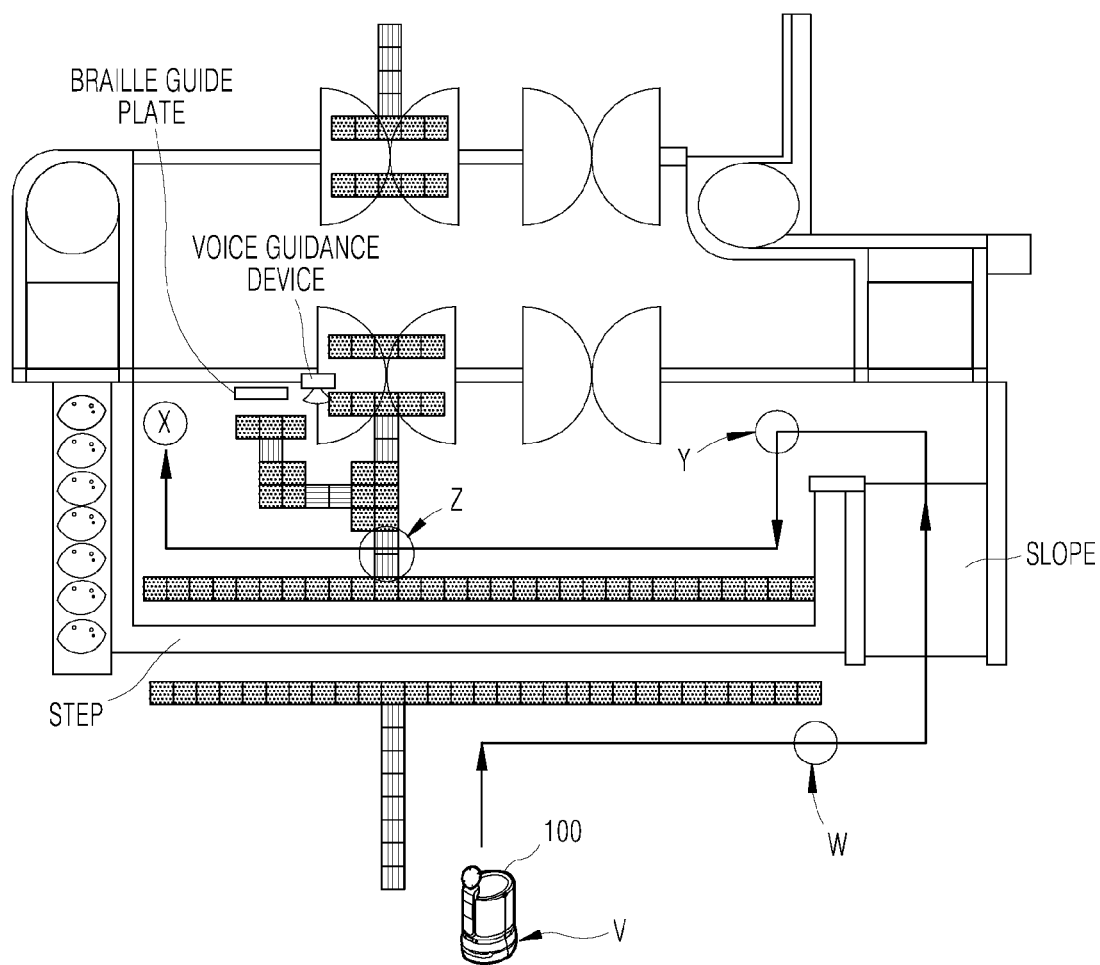
FIGS. 5 and 6 are diagrams for describing a method of driving a robot toward a target point according to an exemplary embodiment.
Figure 6:
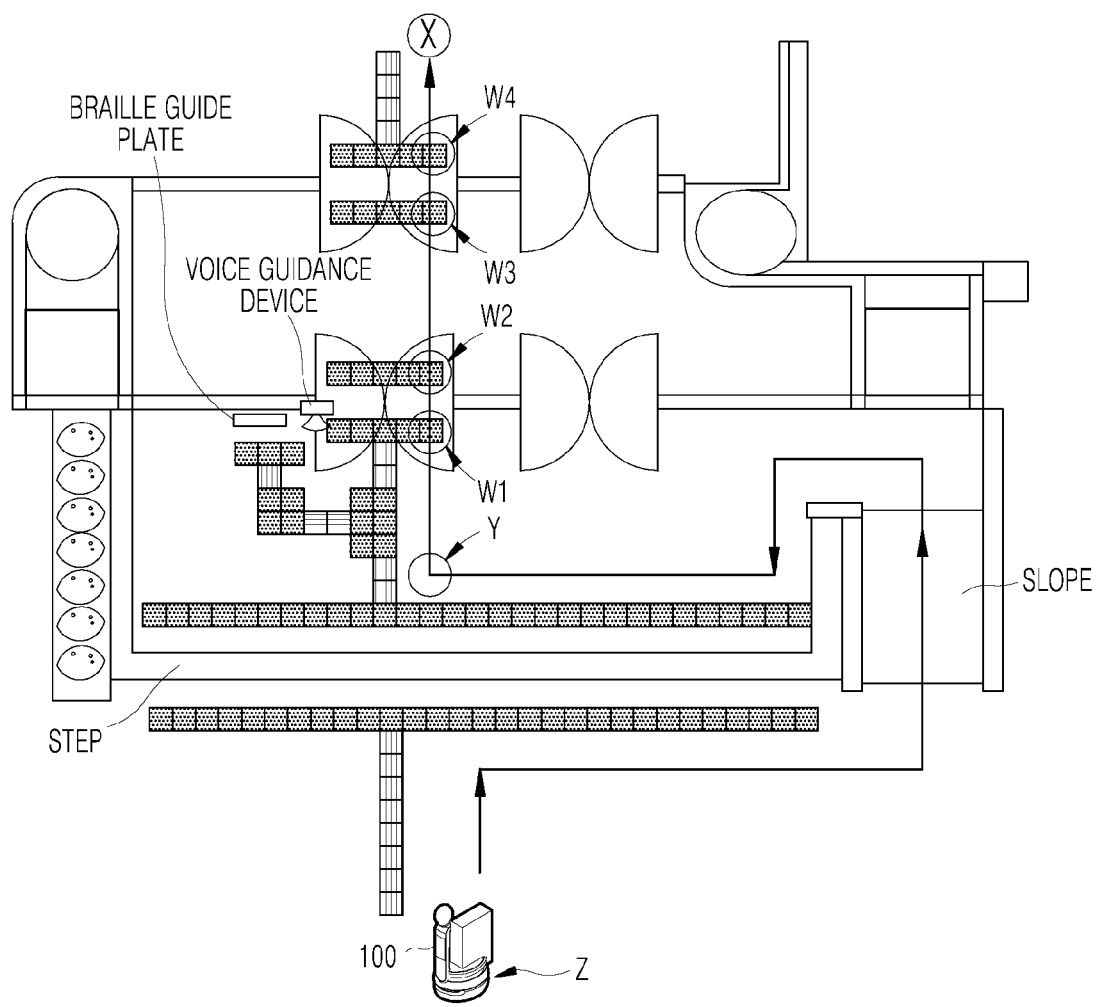

FIGS. 5 and 6 are diagrams for describing a method of driving a robot 100 toward a target point according to an exemplary embodiment. FIGS. 5 and 6 illustrate a target point of the robot 100 as X.

As described above, the robot 100 may set a driving route based on a map held for driving. The map may or may not have data about the braille blocks 10.

When the map includes the data about the braille blocks 10, the robot 100 may set a driving path in consideration of the arrangement of the braille blocks 10 and drive along the set driving path.

When the map does not include the data about the braille blocks 10, the robot 100 may set a driving path without considering the arrangement of the braille blocks 10 and drive along the set driving path when finding the braille blocks 10 while driving.

Hereinafter, a driving method of the robot 100 when the map does not include the data about the braille blocks 10 will be described with reference to FIG. 5 and the like. In the following description, the driving method of the robot 100 when the map includes the data about the braille blocks 10 may be obviously derived.

FIGS. 5 and 6 are plan views illustrating some regions of an airport facility for explanation of the exemplary embodiment. Referring to FIG. 5, a starting point of the robot 100 is represented by V, and a target point at which the robot 100 arrives is represented by X. The target point of the robot 100 is a place adjacent to the door, and is a place adjacent to a place where a braille block 10 for indicating the door is disposed and a braille guide plate and a voice guidance device for guiding the visually impaired person to pass through the door are installed.

An actual driving path of the robot 100 is shown by an arrow. The driving route set by the robot 100 based on the map held by the robot 100 may not hold information on geographic features such as the braille blocks 10, a step, and the slop.

Therefore, the robot 100 may perform the SLAM while driving to recognize the geographic feature on the driving path, and may modify the driving path in real time to overcome the geographic feature.

The robot 100 may drive at a predetermined distance from the first block 11 in the direction in which the first blocks 11 are arranged from V.

The robot 100 may find the second block 12 while driving. The second block 12 may indicate that the driving may not be performed any more due to the step. The robot 100 may bypass the second block 12 in consideration of the position of the second block 12 and the position of the target point, but may drive at a predetermined distance from the second block 12.

The robot 100 may arrive at the point W at which the second block 12 ends while driving, and may detect a slope using a detection sensor. The robot 100 may climb the slope in consideration of the position of the slope and the position of the target point.

The robot 100 may drive in a left direction of the slope, which is only a path, using the detection sensor after climbing the slope. After arriving at point Y, the robot 100 may find second blocks 12 arranged to indicate that there is a step using the detection sensor.

The robot 100 may drive to approach the second block 12 and subsequently, may drive at a predetermined distance from the second block 12 in the direction at which the second blocks 12 are disposed.

The robot 100 may approach a Z point while driving and determine the surrounding situation through the detection sensor. The robot 100 may select to step over the braille blocks 10 in consideration of the surrounding situation and the position of the target point.

For example, when the robot 100 cannot bypass the braille blocks 10 to reach the target point, the robot 100 may step over the braille blocks 10 based on the surrounding situation and the position of the target point detected by the detection sensor.

In this case, the robot 100 may step over the first block 11 at the Z point in order to minimize the length of the section stepping on the braille blocks 10 and to reduce the driving path.

The robot 100 steps on the first block 11 at the Z point and continues to drive, and then shifts a direction by considering the combination of the braille blocks 10 indicating an "L" shaped direction shift adjacent to the end point of the second block 12 and the position of the target point X.

The robot 100 may shift the direction at the end point of the second block 12 and continue driving to reach the target point.

In FIG. 6, the starting point of the robot 100 is Z and the target point is X. The robot 100 illustrated in FIG. 6 may carry a customer's article from indoor to outdoor. To this end, the robot 100 may drive from indoor to outdoor.

Therefore, the target point of the robot 100 is outdoors and needs to pass through the door to go to the target point. The driving method until the robot 100 reaches the point Y is as described above with reference to FIG. 5.

When the robot 100 arrives at the Y point, in consideration of the arrangement of the target point and the braille blocks 10, and the surrounding situation, the robot 100 may change the direction and drive to a W1 point where the door is located.

The robot 100 may drive through the door at the W1 point in consideration of the location of the target point, the feature of driving adjacent to the braille blocks 10 when the braille blocks 10 exist, and the surrounding situation.

At this time, if there is a person in the door, for the safety of the person, the robot may pass through the door after the person passes through the door. In this case, the robot 100 may step over the second block 12 located at the door.

The robot 100 may sequentially pass through doors at W2, W3, and W4 points, and step over the second block 12 disposed at each point, in the same manner as passing through the door at the W1 point.

Meanwhile, the robot 100 may return to the starting point again after arriving at the target point. Similarly, when the robot 100 returns, the robot 100 may form a driving route based on a map held by the robot 100.

However, since the robot 100 performed the SLAM while driving from the starting point to the target point, the robot 100 hold the data about the braille blocks 10. Therefore, the robot 100 may return to the starting point by autonomous driving by setting the driving route based on the map provided with the data about the braille blocks 10.

The robot 100 may recognize the disposed pattern of the braille blocks 10 through the detection sensor and correct the held map.

The robot 100 may detect a boundary between the plurality of braille blocks 10 adjacent to each other through the detection sensor and determine the number of braille blocks 10 by using the detected boundary.

Figure 7:
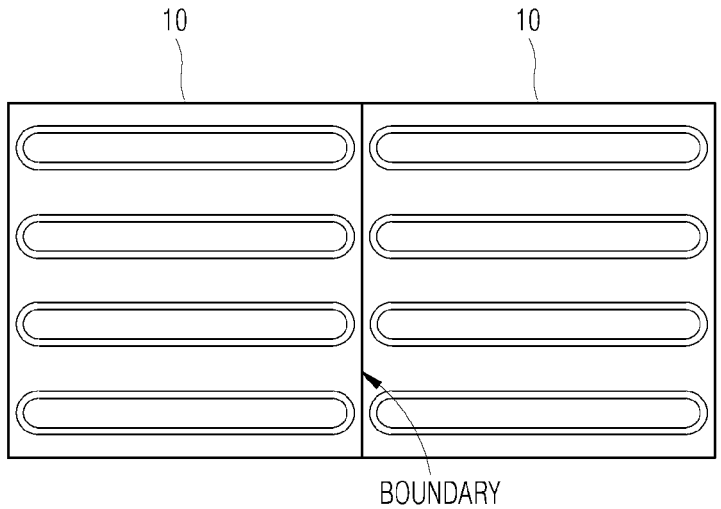
FIG. 7 is a plan view of a boundary between braille blocks according to an exemplary embodiment.

FIG. 7 is a plan view of a boundary between braille blocks 10 according to an exemplary embodiment. The braille blocks 10 may all have the same horizontal and vertical lengths. Even when the patterns of the braille blocks 10 are different from each other, the braille blocks 10 may have the same horizontal and vertical lengths. In the embodiment, the first block 11 and the second block 12 have different patterns, but have the same horizontal and vertical lengths.

When a plurality of braille blocks 10 are arranged, the detection sensor provided in the robot 100 may recognize a boundary where the braille blocks 10 are adjacent to each other.

The robot 100 may determine the number of braille blocks 10 using the detected boundary, and it can be easily seen that the horizontal and vertical lengths of the braille blocks 10 are the same as each other and standardized. Since the length of the braille blocks 10 is known and the number of braille blocks 10 is known, the total length of the braille blocks 10 may be known by multiplying the number of the braille blocks 10 by the length of the braille blocks 10.

The robot 100 may determine its own driving distance by using the number of braille blocks 10 identified while driving. In addition, the data related to the map may be corrected using the driving distance of the robot 100.

Figure 8:
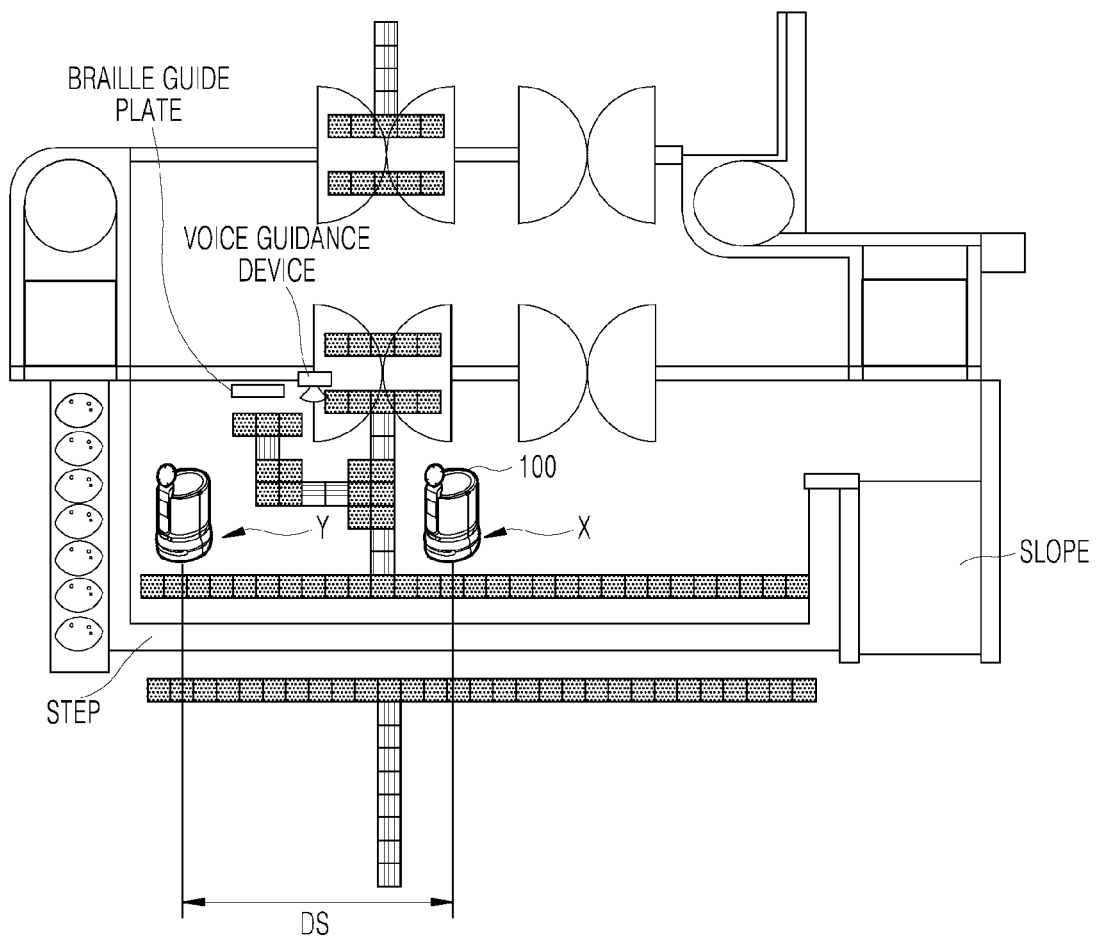
FIGS. 8 and 9 are diagrams for describing a method for driving a robot according to another exemplary embodiment.
Figure 9:
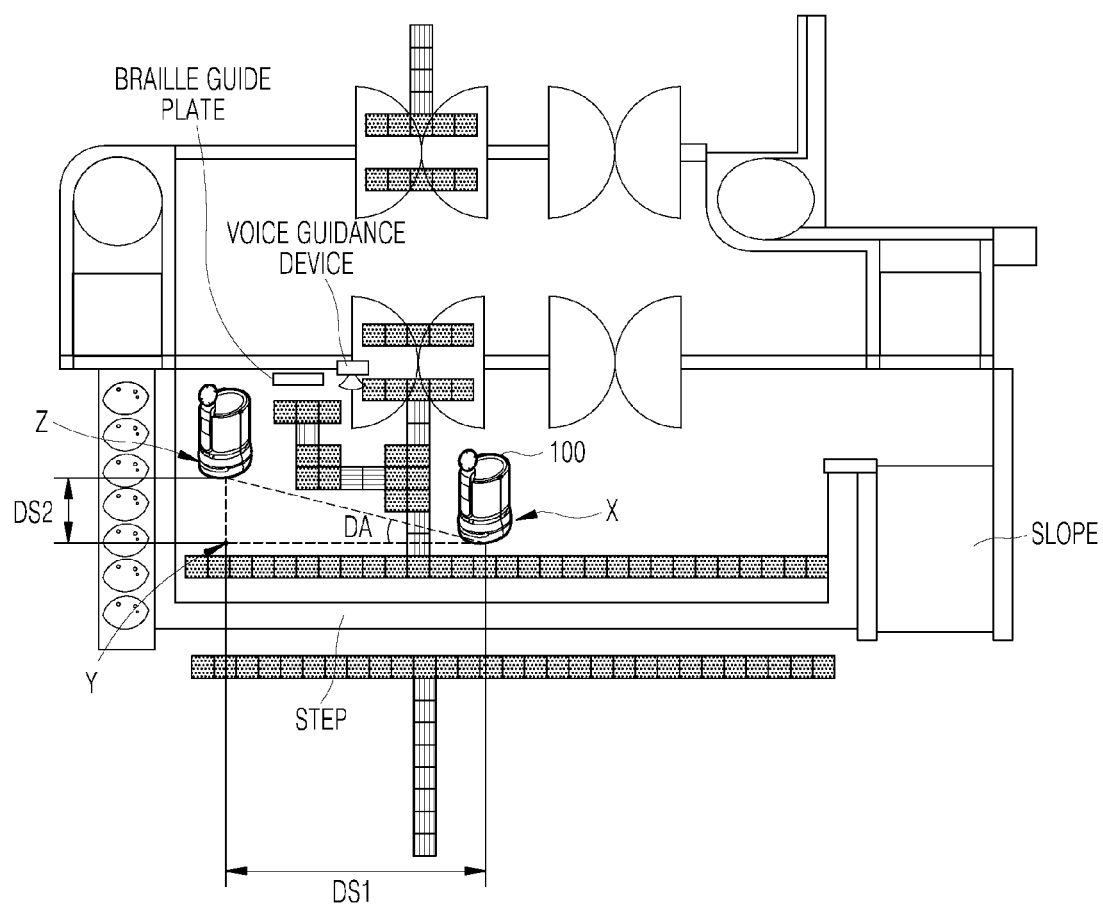

FIGS. 8 and 9 are diagrams for describing a driving method of a robot 100 according to another exemplary embodiment.

Referring to FIG. 8, the robot 100 drives from an X point to a Y point, and the driving distance becomes DS. The robot 100 determines the number of braille blocks 10 arranged in a direction parallel to the driving direction from the X point to the Y point by using a detection sensor, so that the driving distance DS may be known.

By inputting an actual driving distance DS determined by the robot 100 as map data, the map for autonomous driving held by the robot 100 may be updated.

Referring to FIG. 9, the robot 100 drives from the X point to the Z point via the Y point, a driving distance from the X point to the Y point becomes DS1, and a driving distance from the Y point to the Z point becomes DS2.

The robot 100 determines the number of braille blocks 10 arranged in a direction parallel to the driving direction from the X point to the Y point by using a detection sensor, so that the driving distance DS1 may be known. Similarly, the robot 100 determines the number of braille blocks 10 arranged in a direction parallel to the driving direction from the Y point to the Z point by using a detection sensor, so that the driving distance DS2 may be known.

Also, since both DS1 and DS2 are known and the directions of DS1 and DS2 are perpendicular to each other, from this relationship, a direction angle DA viewed from the X point to the Y point may also be known.

By inputting actual driving distances DS1 and DS2 and the direction angle DA determined by the robot 100 as map data, the map for autonomous driving held by the robot 100 may be updated.

In an exemplary embodiment, the braille blocks 10 whose arrangement state is not changed for a long time are recognized, the current position of the robot 100 is determined, a map for autonomous driving is obtained, thereby simply and accurately performing the SLAM.

In an exemplary embodiment, the SLAM is performed by recognizing the braille blocks 10, so that separate expensive equipment for performing the accurate SLAM may not be required or may be reduced, and it may be advantageous in terms of cost.

In an exemplary embodiment, the robot 100 recognizes the second block 12 representing the danger zone among the braille blocks 10 to avoid entry of the danger zone, thereby suppressing the damage to the robot 100 and promoting the safety of people thereareound.

In an exemplary embodiment, when the robot 100 moves along the direction in which the braille blocks 10 are arranged at a position spaced apart from the braille blocks 10, and the robot 100 steps over the braille blocks 10, the robot 10 drives on a path that minimizes the length of the section stepping on the braille blocks 10, thereby significantly reducing the impact applied when the robot 100 steps over the braille blocks 10.

Hereinafter, an AI device, an AI server, and an AI system according to an exemplary embodiment will be described below.

Figure 10:
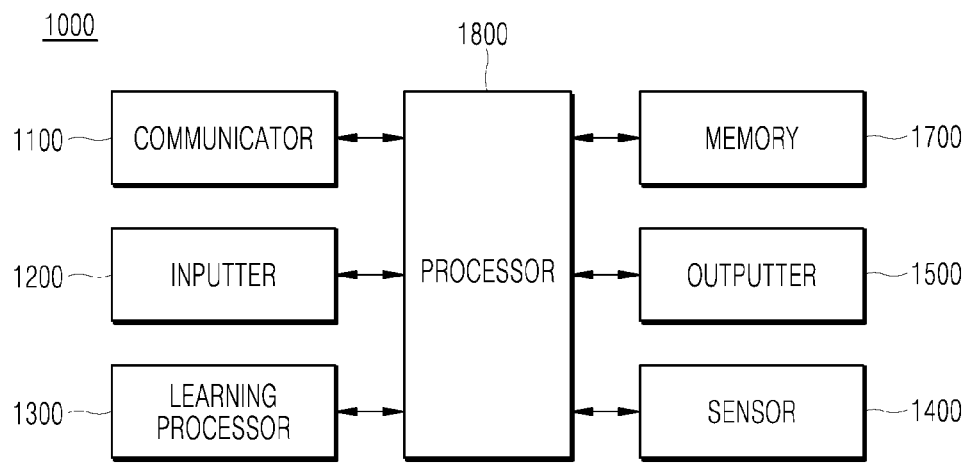
FIG. 10 illustrates an AI device according to an exemplary embodiment.

FIG. 10 illustrates an AI device 1000 according to an exemplary embodiment.

The AI device 1000 may be implemented by fixed devices such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, and a vehicle, or mobile devices.

Referring to FIG. 10, the terminal 1000 may include a communicator 1100, an inputter 1200, a running processor 1300, a sensor 1400, an outputter 1500, a memory 1700, and a processor 1800.

The communicator 1100 may transmit/receive data to/from external devices such as other AI devices 1000a to 1000e or the AI server 2000 using wired or wireless communication technology. For example, the communicator 1100 may transmit or receive sensor data, a user input, a trained model, a control signal, and the like with the external devices.

In this case, the communications technology used by the communicator 1100 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The inputter 1200 may obtain various types of data.

The inputter 1200 may include a camera for inputting an image signal, a microphone for receiving an audio signal, and a user inputter for receiving information inputted from a user. Here, the signal obtained from the camera or microphone may be referred to as sensing data or sensor information by treating the camera or microphone as a sensor.

The inputter 1200 may acquire various kinds of data, such as learning data for model learning and input data used when an output is acquired using a trained model. The inputter 1200 may obtain raw input data. In this case, the processor 1800 or the learning processor 1300 may extract an input feature by preprocessing the input data.

The learning processor 1300 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 1300 may perform AI processing together with a learning processor 2400 of the AI server 2000.

The learning processor 1300 may include a memory which is combined or implemented in the AI device 1000. Alternatively, the learning processor 1300 may be implemented using the memory 1700, an external memory directly coupled to the AI device 1000, or a memory maintained in an external device.

The sensor 1400 may obtain at least one of internal information of the AI device 1000, surrounding environment information of the AI device 1000, and user information using various sensors.

At this time, the sensor included in the sensor 1400 includes a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, a LiDAR, a radar, and the like.

The outputter 1500 may generate a visual, auditory, or tactile related output.

The outputter 1500 may include a display unit outputting visual information, a speaker outputting auditory information, and a haptic module outputting tactile information.

The memory 1700 may store data supporting various functions of the AI device 1000. For example, the memory 1700 may store the input data, learning data, learning model, learning history, and the like acquired by the inputter 1200.

The processor 1800 may determine at least one executable operation of the AI device 1000 based on information determined or generated by using a data analysis algorithm or a machine learning algorithm. In addition, the processor 1800 may control components of the AI device 1000 to perform the determined operation.

To this end, the processor 1800 may request, search, receive, or utilize data of the learning processor 1300 or the memory 1700, and may control components of the AI device 1000 to execute a predicted operation or a preferably determined operation among at least one executable operation.

In this case, when an external device needs to be linked to perform the determined operation, the processor 1800 may generate a control signal for controlling the corresponding external device and transmit the generated control signal to the corresponding external device.

The processor 1800 may obtain intention information with respect to a user input, and determine a requirement of the user based on the obtained intention information.

The processor 1800 may obtain intent information corresponding to user input by using at least one of a speech to text (STT) engine for converting voice input into a character string or a natural language processing (NLP) engine for obtaining intent information of a natural language.

In an exemplary embodiment, the at least one of the STT engine or the NLP engine may be composed of artificial neural networks, some of which are trained according to a machine learning algorithm. In addition, the at least one of the STT engine or the NLP engine may be trained by the learning processor 1300, trained by a learning processor 2400 of an AI server 2000, or trained by distributed processing thereof.

The processor 1800 collects history information including, for example, operation contents and user feedback on an operation of the AI device 1000, and stores the history information in the memory 1700 or the learning processor 1300, or transmits the history information to an external device such as an AI server 2000. The collected history information may be used to update a learning model.

The processor 1800 may control at least some of components of the AI device 1000 to drive an application stored in the memory 1700. Furthermore, the processor 1800 may operate two or more components included in the AI device 1000 in combination with each other to drive the application.

Figure 11:
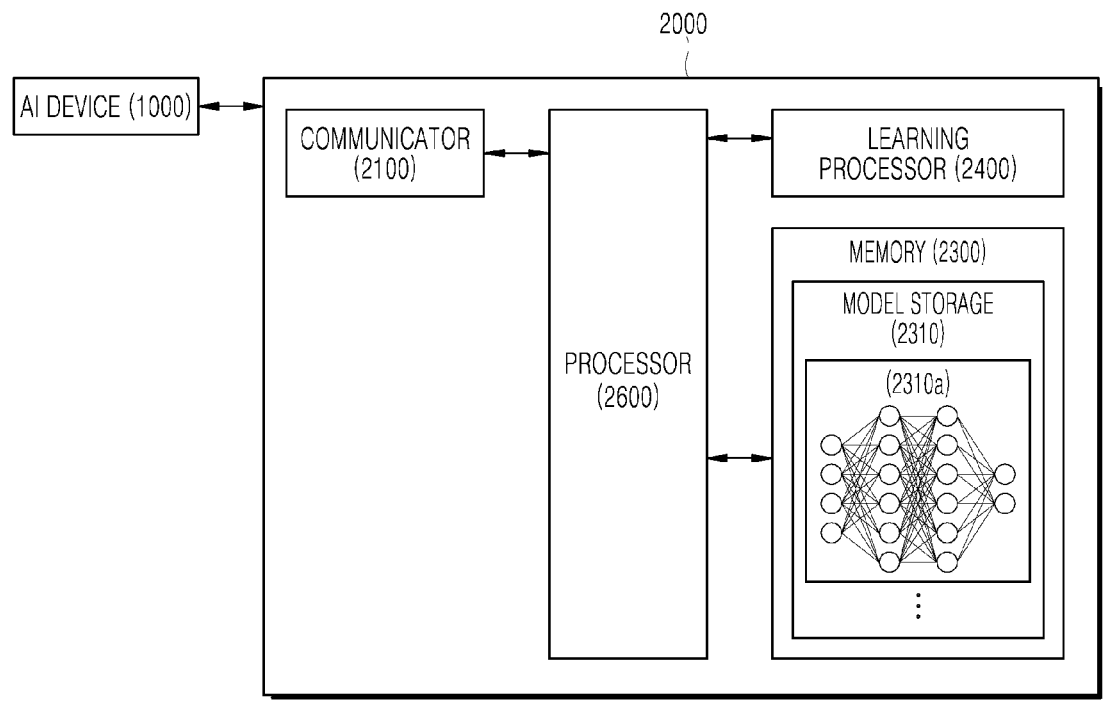
FIG. 11 illustrates an AI server according to an exemplary embodiment.

FIG. 11 illustrates an AI server 2000 according to an exemplary embodiment.

Referring to FIG. 11, the AI server 2000 may refer to a device for training an artificial neural network using a machine learning algorithm or using a trained artificial neural network. Here, the AI server 2000 may include a plurality of servers to perform distributed processing, and may be defined as a 5G network. In this case, the AI server 2000 may be included as a configuration of a portion of the AI device 1000, and may thus perform at least a portion of the AI processing together.

The AI server 2000 may include a communicator 2100, a memory 2300, a learning processor 2400, and a processor 2600.

The communicator 2100 may transmit and receive data with an external device such as the AI device 1000.

The memory 2300 may include a model storage 2310. The model storage 2310 may store a model (or an artificial neural network 2310a) learning or learned via the learning processor 2400.

The learning processor 2400 may train the artificial neural network 2310a by using learning data. The learning model may be used while mounted in the AI server 2000 of the artificial neural network, or may be used while mounted in an external device such as the AI device 1000.

The learning model may be implemented as hardware, software, or a combination of hardware and software. When a portion or the entirety of the learning model is implemented as software, one or more instructions, which constitute the learning model, may be stored in the memory 2300.

The processor 2600 may infer a result value with respect to new input data by using the learning model, and generate a response or control command based on the inferred result value.

Figure 12:
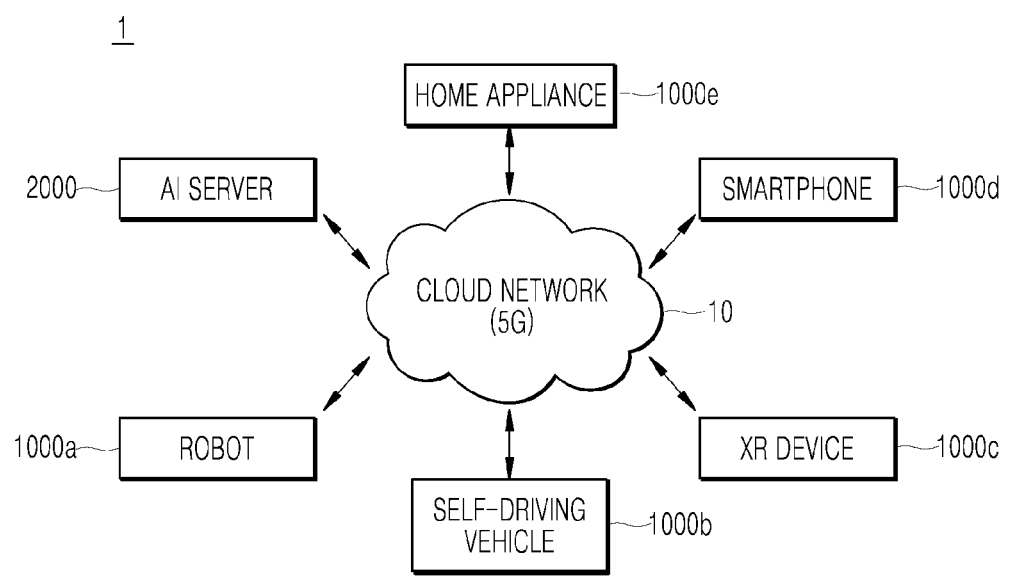
FIG. 12 illustrates an AI system according to an exemplary embodiment.

FIG. 12 illustrates an AI system 1 according to an exemplary embodiment.

Referring to FIG. 12, the AI system 1 may include at least one of an AI server 2000, a robot 1000a, an autonomous driving vehicle 1000b, an XR device 1000c, a smartphone 1000d, or a home appliance 1000e, which is connected with a cloud network 10. Here, the robot 1000a to which the AI technology is applied, the autonomous driving vehicle 1000b, the XR device 1000c, the smartphone 1000d, or the home appliance 1000e may be referred to as the AI devices 1000a to 1000e.

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (1000a to 1000e, 2000) constituting the AI system 1 may be connected to each other through the cloud network 10. In particular, each individual device (1000a to 1000e, 2000) may communicate with each other through the base station but may communicate directly to each other without relying on the base station.

The AI server 2000 may include a server performing AI processing and a server performing computations on big data.

The AI server 2000 may be connected with at least one of the robot 1000a, the autonomous driving vehicle 1000b, the XR device 1000c, the smartphone 1000d, or the home appliance 1000e, which are the AI devices constituting the AI system 1, through the cloud network 10 and may help at least a part of AI processing of the connected AI devices 1000a to 1000e.

At this time, the AI server 2000 may learn an artificial neural network according to a machine learning algorithm instead of the AI devices 1000a to 1000e, and directly store the learning model or transmit the learning model to the AI devices 1000a to 1000e.

At this time, the AI server 2000 may receive input data from the AI device 1000a to 1000e, infer a result value from the received input data by using the learning model, generate a response or control command based on the inferred result value, and transmit the generated response or control command to the AI device 1000a to 1000e.

Similarly, the AI device 1000a to 1000e may infer a result value from the input data by employing the learning model directly and generate a response or control command based on the inferred result value.

Although only some embodiments were described above, other various embodiments may be possible. The technical contents of the embodiments described above may be combined in various manners unless they are not compatible, therefore new embodiments may be achieved.

What is claimed is:

1. A driving method for a robot including a detection sensor, the method comprising:
setting a route based on a map available to the robot;
causing the robot to move along a path according to the route;
identifying, using data from the detection sensor, braille blocks for a visually impaired person as being located relative to the path while the robot is moving along the path;
causing the robot to move along the path according to the braille blocks,
wherein the robot moves at a distance from the braille blocks, and
causing the robot to drive over at least a portion of the braille blocks based on the robot being unable to bypass the braille blocks to reach a target point on the route.

2. The driving method of claim 1, wherein the detection sensor includes a light detection and ranging (LiDAR) sensor.

3. The driving method of claim 1, further comprising:
causing the robot to move along a path that minimizes a length of a section that the robot contacts the braille blocks.

4. The driving method of claim 1, further comprising:
recognizing a pattern of the braille blocks based on data from the detection sensor and updating the map based on the recognizing.

5. The driving method of claim 4, further comprising:
detecting a boundary between adjacent blocks from among the plurality of the braille blocks using the detection sensor;
determining a number of the braille blocks using the detected boundary;
determining a driving distance of the robot using the number of the braille blocks; and
correcting data about the map using the driving distance.

6. The driving method of claim 1, further comprising:
recognizing a pattern of the braille blocks using the detection sensor; and
determining a current position of the robot based on the recognized pattern.

7. A driving method for a robot including a detection sensor, the method comprising:
setting a route based on a map available to the robot;
causing the robot to move along a path according to the route;
identifying, using data from the detection sensor, braille blocks for a visually impaired person as being located relative to the path while the robot is moving along the path; and
causing the robot to move along the path according to the braille blocks,
wherein the robot moves at a distance from the braille blocks,
wherein the braille blocks include a first block for guiding the visually impaired person in a walking direction and a second block for guiding the visually impaired person to stop or change the walking direction,
and wherein the method further comprises:
causing the robot to drive in a direction in which the first block is arranged when the robot recognizes the first block; and
causing the robot to pause when the robot recognizes the second block.

8. The driving method of claim 7, further comprising:
determining whether to drive or determining a driving direction based on a surrounding situation recognized by the detection sensor, when the robot recognizes the second block.

9. The driving method of claim 7, wherein the robot drives at a predetermined distance from the first block or the second block, and wherein the distance is set based on a size of the robot and a size of a space in which the robot is drivable.

10. The driving method of claim 7, wherein the map includes data regarding the braille blocks.

11. The driving method of claim 10, further comprising:
recognizing a position of the braille blocks based on the data to permit the robot to approach the braille blocks.

12. The driving method of claim 7, wherein the map does not include data regarding the braille blocks.

13. The driving method of claim 12, wherein the detection sensor recognizes the braille blocks.

14. The driving method of claim 12, further comprising:
recognizing an existence of the first block or the second block and a pattern within the first block or the second block via the detection sensor; and
determining a driving direction and a driving path based on the recognizing.

15. The driving method of claim 14, further comprising:
storing information regarding an arrangement of the first block or an arrangement of the second block based on data obtained from the detection sensor.

16. A driving method for a robot including a detection sensor, the method comprising:
setting a route based on a map available to the robot;
causing the robot to move along a path according to the route;
identifying, using data from the detection sensor, braille blocks for a visually impaired person as being located relative to the path while the robot is moving along the path, wherein the braille blocks include a first block for guiding the visually impaired person in a walking direction and a second block for guiding the visually impaired person to stop or change the walking direction;
causing the robot to move along the path according to the braille blocks;
causing the robot to drive in a direction in which the first block is arranged when the robot recognizes the first block; and
causing the robot to pause when the robot recognizes the second block.

17. The driving method of claim 16, further comprising:
causing the robot to move at a defined distance from the first block or from the second block, wherein the distance is set based on a size of the robot and a size of a space in which the robot is drivable.

18. The driving method of claim 17, further comprising:
recognizing an existence of the first block or the second block and a pattern within the first block or the second block via the detection sensor, when the map does not have data regarding the braille block;
determining a driving direction and a driving path based on the recognizing; and storing information regarding an arrangement of the first block or the second block based on data obtained from the detection sensor.

19. A robot, comprising:
a memory comprising map data;
a detection sensor; and
a controller configured to:
identify a route based on the map data;
cause the robot to move along a path according to the route;
identify, using data from the detection sensor, braille blocks for a visually impaired person as being located relative to the route while the robot is moving along the path; and
cause the robot to move along the path according to the braille blocks,
wherein the robot moves at a distance from the braille blocks,
wherein the controller is further configured to:
cause the robot to drive over at least a portion of the braille blocks based on the robot being unable to bypass the braille blocks to reach a target point on the route.

* * * * *